US007688786B2

(12) United States Patent
Abrol et al.

(10) Patent No.: US 7,688,786 B2
(45) Date of Patent: Mar. 30, 2010

(54) AVOIDING DATA LOSS AND REDUCING REGISTRATION OVERHEAD IN PACKET NETWORKS

(75) Inventors: Nischal Abrol, San Diego, CA (US); Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1064 days.

(21) Appl. No.: 10/665,929

(22) Filed: Sep. 17, 2003

(65) Prior Publication Data

US 2004/0184436 A1    Sep. 23, 2004

Related U.S. Application Data

(60) Provisional application No. 60/456,025, filed on Mar. 17, 2003.

(51) Int. Cl.
*H04W 4/00* (2006.01)
(52) U.S. Cl. .................. 370/331; 370/324; 370/328; 455/432.1; 455/436
(58) Field of Classification Search ................ 370/331, 370/335, 324, 328; 455/432.1, 436
See application file for complete search history.

(56) References Cited

U.S. PATENT DOCUMENTS

| | | | |
|---|---|---|---|
| 5,867,478 A | | 2/1999 | Baum et al. |
| 6,246,669 B1 * | | 6/2001 | Chevalier et al. ........... 370/238 |
| 6,834,050 B1 * | | 12/2004 | Madour et al. .............. 370/392 |
| 6,876,640 B1 * | | 4/2005 | Bertrand et al. ............. 370/331 |
| 7,103,662 B2 * | | 9/2006 | Ray et al. .................... 709/225 |
| 7,200,126 B2 * | | 4/2007 | Lim ........................... 370/331 |
| 7,209,462 B2 * | | 4/2007 | Sayeedi ...................... 370/335 |
| 2002/0176382 A1 * | | 11/2002 | Madour et al. .............. 370/331 |
| 2003/0027587 A1 | | 2/2003 | Proctor, Jr. |
| 2003/0053431 A1 * | | 3/2003 | Madour ...................... 370/331 |
| 2004/0148427 A1 * | | 7/2004 | Nakhjiri et al. ............. 709/237 |

* cited by examiner

*Primary Examiner*—Charles N Appiah
*Assistant Examiner*—Kwasi Karikari
(74) *Attorney, Agent, or Firm*—Kevin Cheatham; Darren M. Simon

(57) ABSTRACT

Techniques for avoiding data loss and reducing registration overhead in a wireless packet data communication system are disclosed. In one embodiment, a mobile station adds each connection to a connection list following registration with the PCF. The mobile station need not reregister a connection included in the connection list when it again enters the PCF's coverage area. In another embodiment, a PDSN maintains a connection table, with one or more connections for each mobile station. The PDSN transmits data to the mobile station along one of the connections. In yet another embodiment, a PDSN transmits on an active connection, if one exists. In yet another embodiment, connections in a connection list or connection table are removed when a corresponding inactivity timer expires. Various other embodiments are also presented. Benefits include allowing mobile stations to travel between PCFs without re-registering, which reduces registration overhead and increases system capacity, and avoidance of data loss from network initiated data directed to a mobile station, resulting in timely delivery of the data and reduction of system resources allocated to retransmission of data.

17 Claims, 8 Drawing Sheets

AVOIDING DATA LOSS AND REDUCING REGISTRATION OVERHEAD IN PACKET NETWORKS

RELATED APPLICATION

This application claims priority to U.S. Provisional Patent Application No. 60/456,025 filed Mar. 17, 2003.

FIELD

The present invention relates generally to wireless communications, and more specifically to avoiding data loss and reducing registration overhead in packet networks.

BACKGROUND

Wireless communication systems are widely deployed to provide various types of communication such as voice and data. These systems may be based on code division multiple access (CDMA), time division multiple access (TDMA), or some other multiple access techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards. An example non-CDMA system is the GSM system.

A wireless packet data communication system may comprise one or more Packet Data Serving Nodes (PDSNs), each of which connect to one or more Packet Coordination Functions (PCFs), which communicate with one or more mobile stations over a physical channel. To maintain the location of a mobile station within a network and to facilitate network initiated data for transmission to that mobile station, current systems may require a mobile station to register with each PCF as it enters the PCF's coverage area. As a mobile station travels between a group of PCFs, repeated registrations may occur. This registration overhead uses system resources and reduces overall system capacity.

When a mobile station moves from one PCF to another, it is possible for data directed from a PDSN to a mobile station to be lost while the mobile station reregisters with the new PCF. This data loss may result in retransmission, which results in transmission delay and uses system resources and reduces overall system capacity. There is therefore a need in the art for avoiding data loss and reducing registration overhead in a wireless packet data communication system.

SUMMARY

Embodiments disclosed herein address the need for avoiding data loss and reducing registration overhead in a wireless packet data communication system. In one embodiment, a mobile station adds each connection to a connection list following registration with the PCF. The mobile station need not reregister a connection included in the connection list when it again enters the PCF's coverage area. In another embodiment, a PDSN maintains a connection table, with one or more connections for each mobile station. The PDSN transmits data to the mobile station along one of the connections. In yet another embodiment, a PDSN transmits on an active connection, if one exists. In yet another embodiment, connections in a connection list or connection table are removed when a corresponding inactivity timer expires. Various other embodiments are also presented. Benefits include allowing mobile stations to travel between PCFs without re-registering, which reduces registration overhead and increases system capacity, and avoidance of data loss from network initiated data directed to a mobile station, resulting in timely delivery of the data and reduction of system resources allocated to retransmission of data.

DETAILED DESCRIPTION

Figure 1:
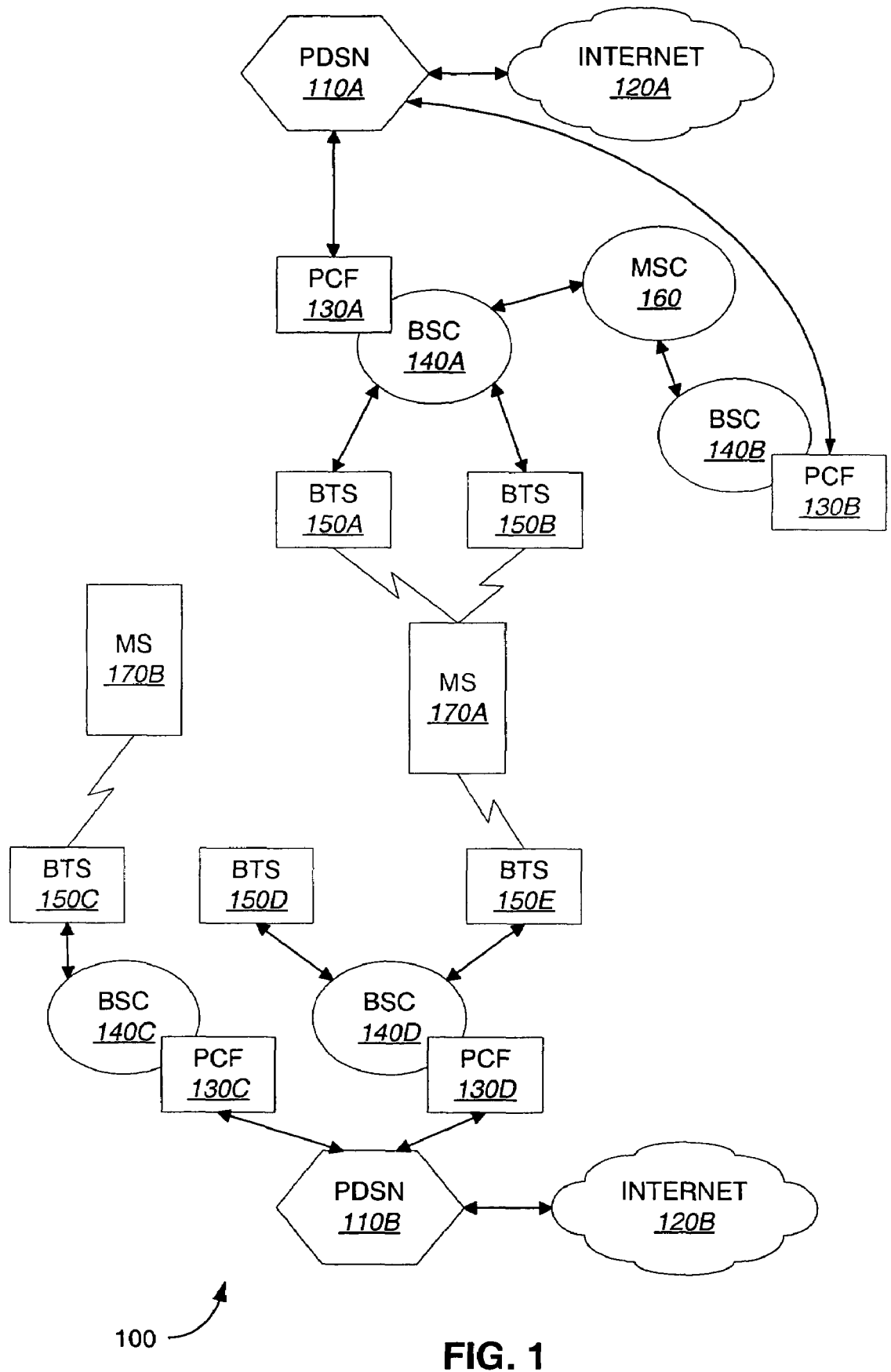
FIG. 1 is a general block diagram of a wireless communication system shown to support a number of users.

FIG. 1 is a diagram of a wireless communication system 100 that may be designed to support one or more wireless standards and/or designs (e.g., the W-CDMA standard, the IS-95 standard, the cdma2000 standard, the HDR specification, the 1xEV-DV proposal, the GSM standard). In the exemplary embodiment, system 100 supports cdma2000 communications.

For simplicity, system 100 is shown to include an example configuration of typical base station components, including a Mobile Switching Center (MSC) 160, Base Station Controllers (BSCs) 140, and Base Transmission Substations (BTSs) 150. Two mobile stations 170 are communicating with base stations, each through one or more BTS 150. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or Node B. The term mobile station can be used interchangeably with the terms user equipment (UE), subscriber unit, subscriber station, access terminal, remote terminal, or other corresponding terms known in the art. The term mobile station encompasses fixed wireless applications. A mobile station is an example of a wireless communication device.

Depending on the system being implemented, each mobile station 170 may communicate with one (or possibly more) base stations on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples described herein may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

A Packet Data Serving Node (PDSN) 110A communicates with an external network, in this example the external network is the Internet 120A. In an alternate embodiment, any network may be deployed, such as a corporate intranet. PDSN 110A is connected with Packet Coordination Functions (PCFs) 130A-B. PCFs, in this embodiment, reside within BSCs 140A and 140B in this instance. Two BTSs 150A and 150B are shown connected to BSC 140A, which communicate on the physical channel with one or more mobile stations, or mobile station 170A in this example (BTSs connected to BSC 140B are omitted for clarity). MSC 160 is shown connected to BSCs 140A and 140B. Use of an MSC is well known in the art for controlling various communication activities between base stations and mobile stations. For example, an MSC may be used to facilitate mobile station paging within the network. The principles disclosed apply to wireless communication systems that include an MSC.

However, some wireless communication systems do not require an MSC, which can be relatively expensive. One example is a data only system such as 1X-EVDO (i.e. the HDR specification). As shown, mobile stations 170A and 170B may also communicate with an external network, Internet 120B, in this instance, through BTSs 150C-E, BSCs 140C-D, PCFs 130C-D, and PDSN 110B, as shown. Note that these example components are not connected to an MSC.

The physical layer, i.e. the wireless link between the mobile station 170 and a BTS, may be of any type. In this example, the physical layer is deployed according to the cdma2000 standard. Each PCF advertises its identity to mobile stations within its coverage area. The identity may be transmitted in any form. In this example, each PCF transmits a unique identifier made up of a System Identifier (SID), Network Identifier (NID), and Packet Zone Identifier (PZID). By convention, wireless communication systems are deployed such that a SID/NID/PZID combination may be used to identify any PCF uniquely.

In the prior art, according to IS-707-A, a mobile station was required to perform a packet registration (a fake origination) whenever a change in PCF identifier was detected. While this allowed the mobile station's location to be monitored, it required allocation of system resources to do so. A mobile station may travel back-and-forth repeatedly between two PCFs, particularly when operating at the border between them. In such a situation, a mobile station would be required to repeatedly send a fake origination each time. Furthermore, existing schemes in the prior art deployed to reduce this registration overhead often suffer data loss from the network during a period in which a mobile station must be located. Techniques described herein may be deployed to reduce registration overhead while avoiding data loss.

When a mobile station registers with a PCF, the PCF sets up an associated connection with a PDSN. In this embodiment, an R-P connection, or Radio Access Network (RAN) to PDSN connection, is set up. Thus, when the data from the network arrives at a PDSN for delivery to a mobile station, the PDSN routes the data through the R-P connection to the respective PCF, and on to the mobile station across the physical layer. Techniques disclosed herein allow each mobile station to maintain a list of registrations, or connections, with visited PCFs. A mobile station need not re-register when it encounters a PCF maintained in its list of connections, thus reducing registration overhead. A PDSN may also support multiple connections with a single mobile station through multiple respective PCFs. These are detailed further below.

When data arrives at a PDSN for delivery to a mobile station, techniques disclosed herein may be used to select one of the multiple connections, or otherwise locate a mobile station, for delivery of the data. A mobile station may be in the process of switching from one PCF to another. In the prior art, a PDSN which directed data to the mobile station on the prior PCF would not buffer the data. When the new PCF established the new R-P connection with the PDSN, the data transmitted on the prior connection was already lost. In embodiments described below, a buffer is deployed for the transmission data to avoid data loss while this determination is made.

Figure 2:
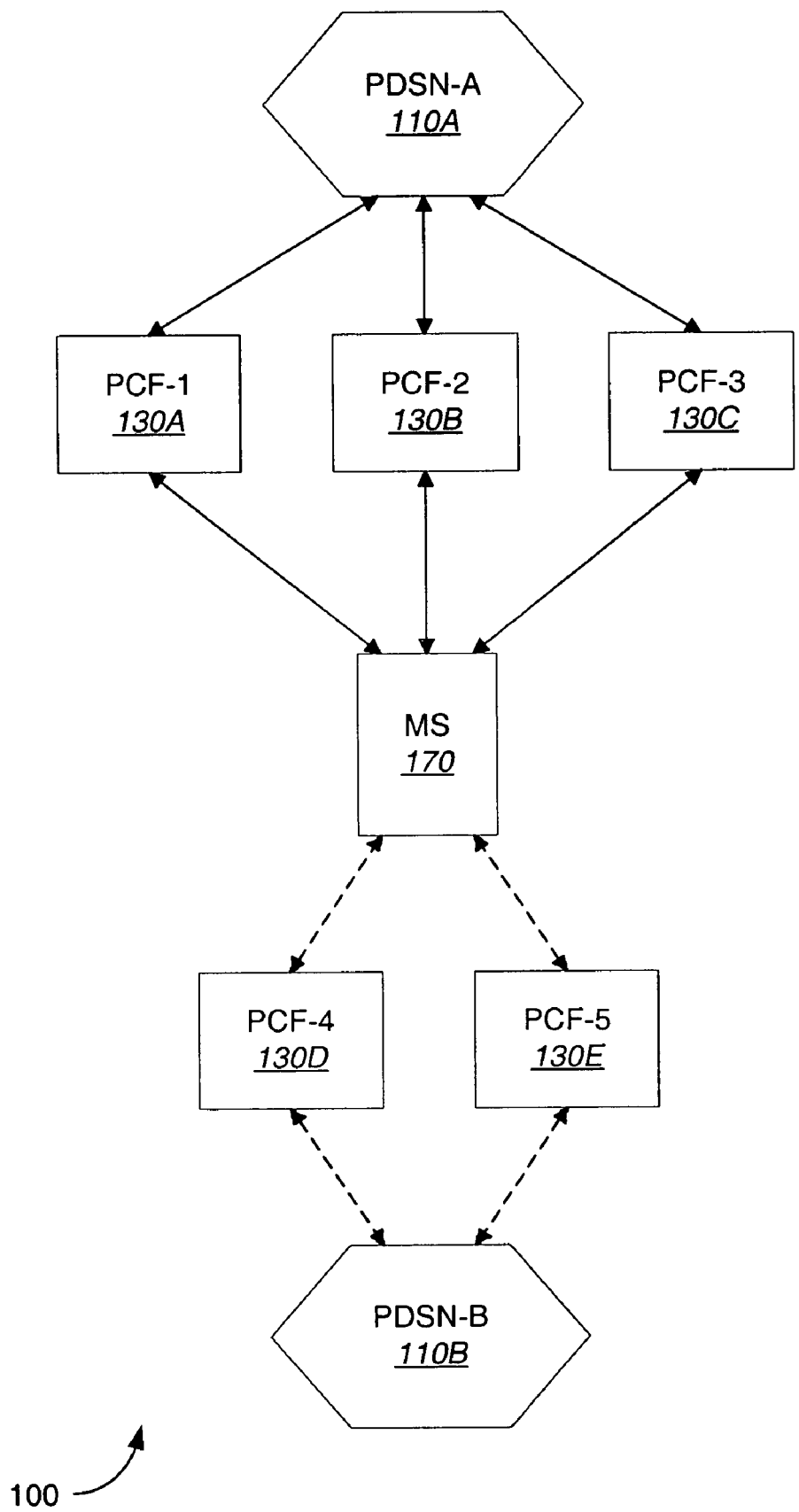
FIG. 2 is block diagram of a wireless communication system illustrating a mobile station setting up and maintaining multiple connections between PDSNs and PCFs.

FIG. 2 depicts an embodiment of a wireless communication system 100, shown with a subset of components for illustration purposes. In this example, PCF-1, PCF-2, and PCF-3, 130A-C, respectively, advertise PZIDs 1, 2 and 3, respectively, and can communicate with PDSN-A 110A. PCF-4 and PCF-5, 130D-E, respectively, advertise PZIDs 4 and 5, respectively, and communicate with PDSN-B 110B.

When mobile station 170 arrives in PCF-1's coverage area, it detects PZID 1. The mobile station performs a Packet Zone Registration with PCF-1. In this example, the registration mechanism is as described in IS-707-A-2.12. The mobile station adds PCF-1 to its Visited PCF List. A Visited PCF List is an example of a connection table, described further below. PCF-1 sets up a connection with PDSN-A. In this example, the connection is an R-P connection. The mobile station then becomes dormant, and eventually moves to the coverage area of PCF-2. The mobile station detects PZID 2 and registers with PCF-2, and adds PCF-2 to its Visited PCF List. PCF-2 sets up a second connection for the mobile station with PDSN-A. There are now two connections between PDSN-A and mobile station 170, one through PCF-1 and another through PCF-2.

Mobile station 170 is now active on PCF-2, and PCF-2 sends PDSN-A a control message indicating that the connection to PCF-2 is active. During this time, PDSN-A sends data traffic to mobile station 170 through the active connection, via PCF-2. As shown, mobile station 170 may also enter the coverage area of PCF-3, register with it, and a corresponding R-P connection will be established for the mobile station between PDSN-A and PCF-3. Only one connection will be active at a time, the other connections will be in a suspended state. When a connection is designated active, a PDSN may use that connection to communicate with a mobile station.

Assume now that the mobile station has gone dormant, and, while three connections exist between the mobile station and PDSN-A, none of them are active. The mobile station may travel into and out of the coverage area of any of these three PCFs, and no registration needs to be performed, thus avoiding the overhead associated with such registration. However, since multiple connections exist for the mobile station between PDSN-A and PCFs 1-3, when a packet arrives at PDSN-A for transmission to mobile station 170, PDSN-A has a choice of how to transmit to the mobile station. Since none of the connections are active at this time, the PDSN does not know the PCF in whose coverage area the mobile station is currently located. One option for locating the mobile station is to send the data packet to all the existing connections simultaneously. This may cause the mobile station to be paged in each of the three respective PCF coverage areas. This option introduces traffic on all the R-P connections, and uses paging channel capacity in all three areas as well. However, the mobile station is likely to be located quickly if it still remains in any of the three coverage areas.

An alternate option for locating the mobile station, which uses less paging channel capacity, on average, and requires less traffic on the R-P connections, on average, is to attempt to send the packet on a subset of the existing connections. For example, a single connection may be selected, and an attempt to deliver the packet is made on the selected connection. In one embodiment, the most recent active connection is selected first. If there is no response from the mobile station on the connection within a predetermined period of time, a second attempt is made on a second connection. The second most recent active connection may be selected, in one embodiment. The existing connections may then be attempted serially until the mobile station is located, or the list is exhausted. The order of selection of connections may follow any other method as well, for instance, the selection may be random. A hybrid of these two approaches may also be deployed, in which subsets of connections are attempted simultaneously, and additional subsets are attempted should the mobile station not be located during an attempt to transmit in a selected subset.

It may be desirable to prune the number of connections established from time to time. For example if mobile station 170 has not visited the coverage area of PCF-1 for some time, PDSN-A may tear down the R-P connection to PCF-1. In one embodiment, inactivity timers may be maintained in the mobile station and the PDSN. The PDSN in the mobile station may start their respective timers for a connection when the mobile station becomes inactive on the respective PCF. In one example, registering and/or establishing a traffic channel with a second PCF may indicate that the connection with a first PCF is no longer active. Any other type of communication between a mobile station in a PCF may be used to signal an active connection. When the inactivity timers for a particular connection expire, the mobile station may remove the respective connection from its connection table. In this example, the mobile station removes the respective PCF from its Visited PCF List. The PDSN may also remove the respective connection from its connection table, and close the R-P session with the respective PCF. Example techniques for pruning connection lists are detailed further below.

Multiple PDSNs in a network may be coordinated, and thus able to share a connection information for a mobile station, or may be uncoordinated. In the embodiment of FIG. 2, PDSN-B 110B is not coordinated with PDSN-A 110A. When mobile station 170 establishes one or more connections with PCF-4 or PCF-5, and respective R-P connections are established with PDSN-B, as indicated by dashed lines, it may be desirable for the mobile station to clear connections associated with PDSN-A. In this example, the PCFs associated with one PDSN cannot communicate with the other PDSN. Thus, when a mobile station enters the coverage area of a second PDSN, the connections to a first PDSN need not be maintained. A variety of techniques for determining when the mobile station has entered the coverage area of a new PDSN may be deployed, examples of which are detailed below. A mobile station may determine the need to clear its connection table, or a message to clear the connection table may be signaled from a PCF. For example, a pre-existing message such as the Service Option Control Message described in Sec. 2.2.6 of IS-707-A-2.12 may be used to signal the mobile to clear its Visited PCF List.

Figure 3:
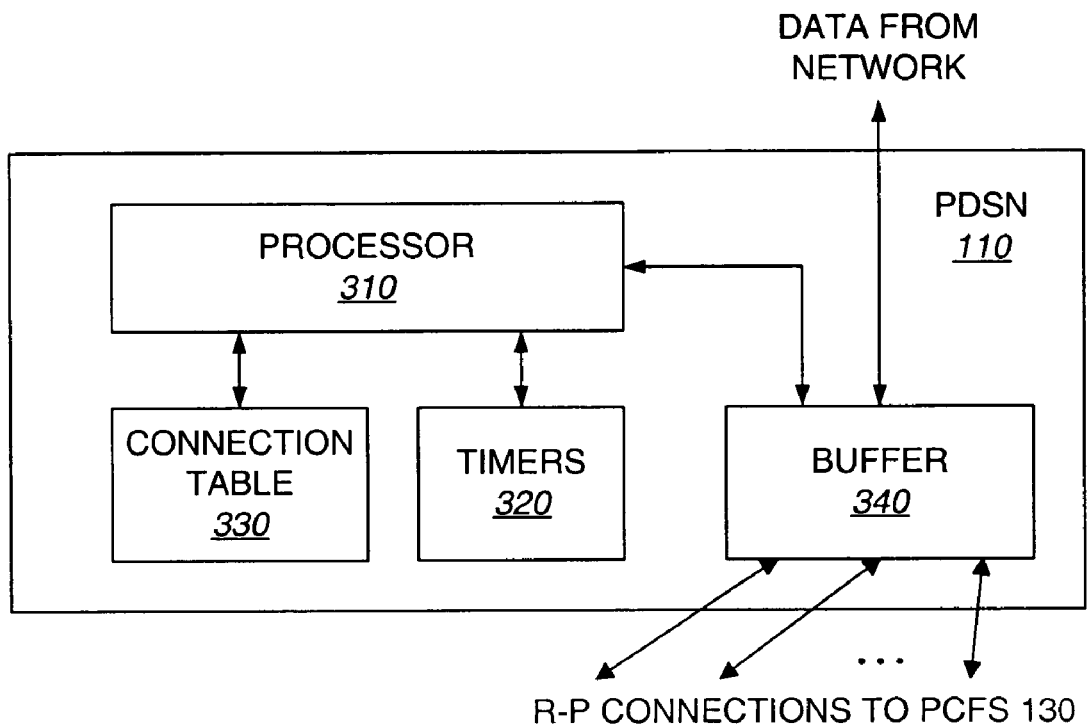
FIG. 3 is a block diagram of a PDSN.

FIG. 3 is a block diagram of an embodiment of a PDSN 110. A subset of the components of the PDSN are shown for clarity of discussion. Processor 310 is shown connected with a connection table 330, timers 320, and a buffer 340. Processor 310 stores connection information for multiple connections for each mobile station in connection table 330. Connection table 330 may also maintain an indication of which connection, if any, is active for a particular mobile station. Example techniques for using a connection table 330 are detailed further below.

Timers 320 may be used by processor 310 to determine whether to remove a connection from connection table 330. Although shown as a discrete block, timers 320 may be carried out in processor 310. Example techniques for using timers 320 are detailed further below.

Network data traffic designated for delivery to a mobile station may be delivered to buffer 340 for storage. This may be used to allow time for the PDSN to locate the mobile station on one of the connections maintained in connection table 330. Data from buffer 340 is transmitted to a mobile station, via a PCF, along one of the R-P connections. Various other components for communicating with a network and PCFs may also be included in PDSN 110 (not shown).

Figure 4:
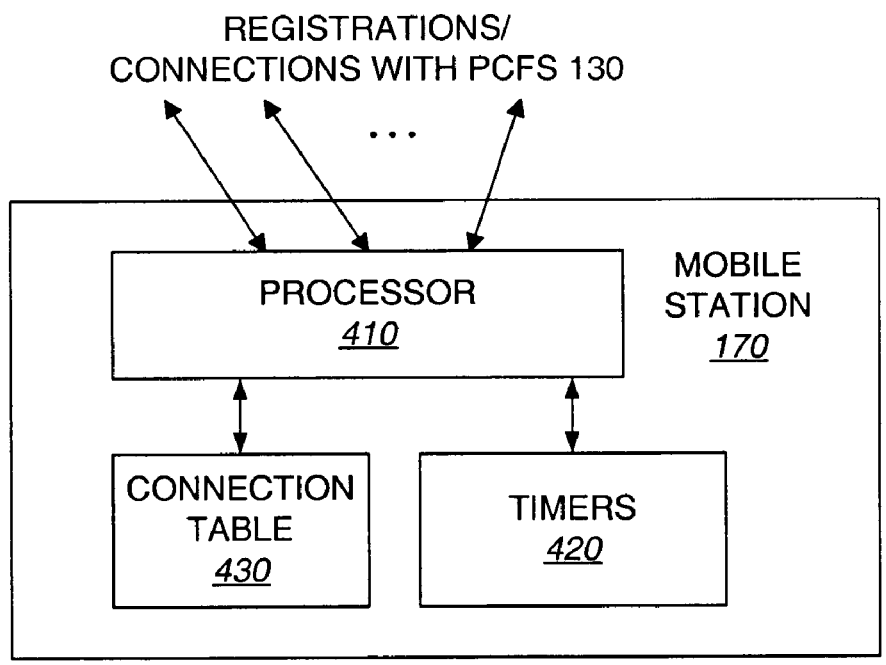
FIG. 4 is a block diagram of a mobile station.

FIG. 4 is a block diagram of an embodiment of a mobile station 170. A subset of the components of the mobile station are shown for clarity of discussion. Processor 410 performs registrations and maintains connections with one or more PCFs 130. The list of visited PCFs, as well as registration information, may be stored in connection table 430. Timers 420 may be used to maintain the connection list. Connections may be removed from connection table 430 upon expiration of a corresponding timer. Example techniques for maintaining multiple connections are detailed further below.

Figure 5:
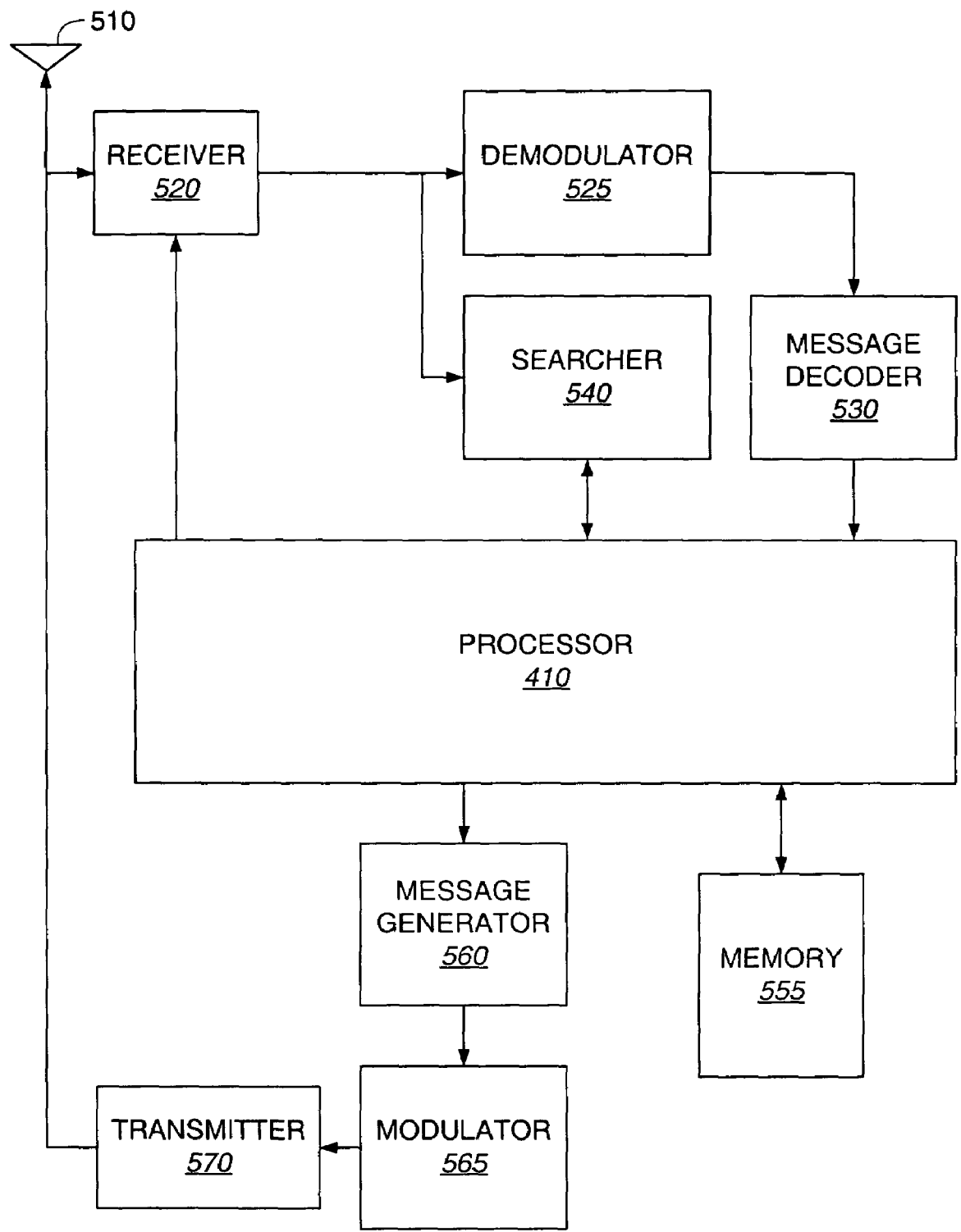
FIG. 5 is a block diagram of a wireless communication device, such as a mobile station.

FIG. 5 is a block diagram of a wireless communication device, such as mobile station 170. The blocks depicted in this example embodiment will generally be a subset of the components included in a mobile station 170. Those of skill in the art will readily adapt the embodiment shown in FIG. 5 for use in any number of mobile station configurations. Components described may be adapted for use in a PDSN or PCF, as will be apparent to one of skill in the art. A wireless communication device may comprise one or more Integrated Circuits (ICs). For example, a receiver may comprise one or more special purpose ICs along with a baseband processing IC. Those of skill in the art will recognize that the various blocks illustrated below may be configured in any combination of hardware (including special purpose ICs and/or general purpose processors) and/or software.

Signals are received at antenna 510 and delivered to receiver 520. Receiver 520 performs processing according to one or more wireless system standards, such as the standards listed above. Receiver 520 performs various processing such as Radio Frequency (RF) to baseband conversion, amplification, analog to digital conversion, filtering, and the like. Various techniques for receiving are known in the art. Receiver 520 may be incorporated with one or more components of the wireless communication device in a Radio Frequency IC (RFIC) (details not shown).

Signals from receiver 520 are demodulated in demodulator 525 according to one or more communication standards. In an example embodiment, a demodulator capable of demodulating cdma2000 signals is deployed. In alternate embodiments, alternate standards may be supported, and embodiments may or may not support multiple communication formats. Demodulator 530 may perform RAKE receiving, equalization, combining, deinterleaving, decoding, and various other functions as required by the format of the received signals. Various demodulation techniques are known in the art. Data and control channels are examples of channels that can be received and demodulated in receiver 520 and demodulator 525.

Message decoder 530 receives demodulated data and extracts signals or messages directed to the mobile station 170 on the forward link. Message decoder 530 decodes various messages used in setting up, maintaining and tearing down a call (including voice or data sessions) on a system. Messages may include PCF identifiers, paging messages, other messages (examples of which are detailed herein), as well as any control channel messages used for demodulating the forward link. Various other message types are known in the art and may be specified in the various communication standards being supported. The messages are delivered to processor 550 for use in subsequent processing. Some or all of the functions of message decoder 530 may be carried out in processor 550, although a discrete block is shown for clarity of discussion. Alternatively, demodulator 525 may decode certain information and send it directly to processor 550 (a single bit message such as an ACK/NAK or a power control up/down command are examples).

Searcher 540 is also deployed to receive signals from receiver 520. Searcher 540 may perform searching on incoming received samples as well as off-line searching on data from a sample RAM (details not shown). Searcher 540 performs searching in accordance with search parameters provided by processor 550. Various techniques for initiating searches of various types with searcher 240 are well known in the art.

Signals are transmitted via antenna 510. Transmitted signals are formatted in transmitter 570 according to one or more wireless system standards, examples of which are listed above. Examples of components that may be included in transmitter 570 are amplifiers, filters, digital-to-analog (D/A) converters, radio frequency (RF) converters, and the like. Data for transmission is provided to transmitter 570 by modulator 565. Data and control channels can be formatted for transmission in accordance with a variety of formats. Examples of components that may be incorporated in modulator 565 include encoders, interleavers, spreaders, and modulators of various types.

Message generator 560 may be used to prepare messages of various types, as described herein. Various types of control messages may be generated in a mobile station 170 for transmission on the reverse link.

Data received and demodulated in demodulator 525 may be delivered to processor 550 for use in voice or data communications, as well as to various other components. Similarly, data for transmission may be directed to modulator 565 and transmitter 570 from processor 550. For example, various data applications may be present on processor 550, or on another processor included in the wireless communication device 170 (not shown). Wireless communication device 170 may include a link to or be incorporated with an external device, such as a laptop computer (not shown).

Processor 550 may be a general-purpose microprocessor, a digital signal processor (DSP), or a special-purpose processor. Processor 550 may perform some or all of the functions of receiver 520, demodulator 525, message decoder 530, searcher 540, message generator 560, modulator 565, or transmitter 570, as well as any other processing required by the wireless communication device. Processor 550 may be deployed to perform timer functions such as those described with respect to timer block 420, above. Processor 550 may be connected with special-purpose hardware to assist in these tasks (details not shown). Data or voice applications may be external, such as an externally connected laptop computer or connection to a network, may run on an additional processor within wireless communication device 170 (not shown), or may run on processor 550 itself. Processor 550 is connected with memory 555, which may be used for storing data as well as instructions for performing the various procedures and methods described herein. Memory 555 may be used to store connection lists, or a connection table such as connection table 430, described above. Those of skill in the art will recognize that memory 555 may be comprised of one or more memory components, of various types, that may be embedded in whole or in part within processor 550.

Figure 6:
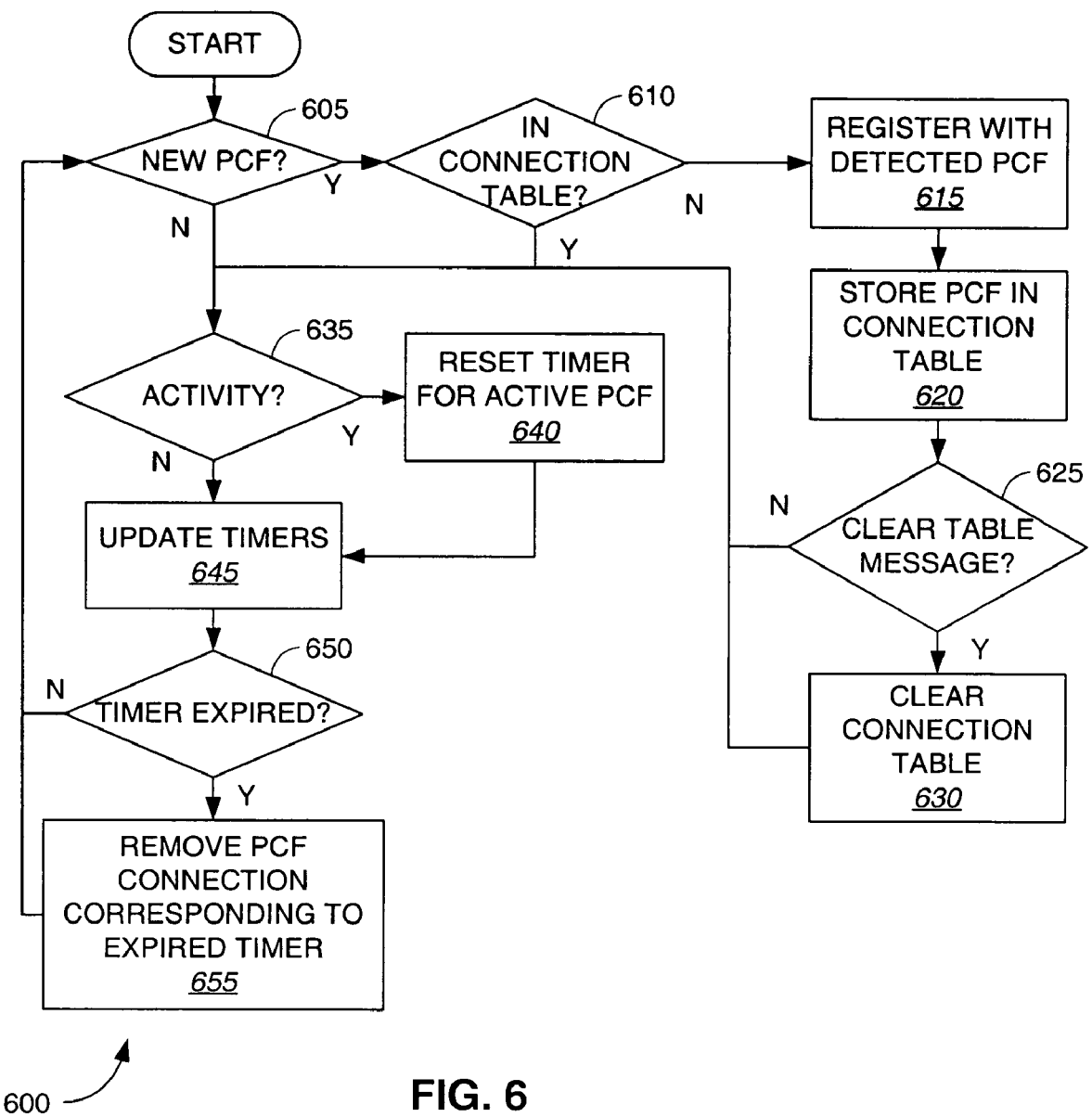
FIG. 6 is a flowchart of a method of maintaining multiple connections in a mobile station.

FIG. 6 is a flowchart of a method 600 of maintaining multiple connections in a mobile station. The process begins in decision block 605. If the mobile station detects a new PCF, proceed to decision block 610. If the PCF detected is stored in the connection table already, proceed to decision block 635. A registration does not need to be performed. Otherwise, proceed to step 615 and register with the detected PCF. A registration message may contain information that can be used to identify the previously connected PDSN. For example, a PDSN identifier may be transmitted. Alternatively, a PCF may contact the PDSN to determine if the old PCF is connected to that PDSN. Or, a PCF identifier may be transmitted, and the PCFs associated with a PDSN is known to a PCF, allowing the PCF to determine if the mobile station previously connected to an alternate PDSN (the use of this information is detailed further below). At the same time, the detected PCF may be stored in the connection table, as shown in step 620. In one embodiment, the connection table is a Packet Zone List (or visited PCF list). Any number of parameters may be stored along with the PCF, such that when the mobile station revisits the PCF, the stored information allows the mobile station to omit registration and avoid the associated overhead costs.

In decision block 625, if the PCF sends the mobile station a clear table message, proceed to step 630 and clear the connection table. This feature is optional, and may be used when a mobile station travels between uncoordinated PDSNs. When a mobile station establishes communication with a PDSN that is not coordinated with the previous PDSN, maintaining multiple connections, techniques for which are described herein, may not be convenient. In such a case the mobile station may be directed to clear the connection table of the connections associated with the previous PDSN. In the embodiment shown in FIG. 6, the mobile station clears the connection table in response to the message from the PCF. In an alternate embodiment, the mobile station may detect the transition to a new PDSN. For example, if a Point-to-Point Protocol (PPP) re-sync occurs subsequent to the registration, the mobile station may detect a different PDSN IP address, and thus will clear the connection table in response. Any other mechanism for detecting a transition to an uncoordinated PDSN may be used to clear the connection table within the scope of the present invention. If no clear table message is received (or other method of detecting a new, uncoordinated PDSN), or the connection table has been cleared, proceed to decision block 635. In an alternate embodiment, in which multiple PDSNs are coordinated, multiple connections may be maintained across the PDSNs, and the connection table may not need to be cleared.

Another feature illustrated in the embodiment depicted in FIG. 6 is pruning the maintained connections. In this example, inactivity timers are deployed for each connection. When a connection timer expires, the connection is removed from the connection table. In one embodiment, the final connection is not removed, based on inactivity, to ensure that at least one connection remains. In an alternate embodiment, any or all connections may be removed based on inactivity. In yet another alternate embodiment, a longer expiration time may be deployed for removing the final connection. Parallel timers are maintained in the PDSN, as described in further detail below. The PDSN expiration times may be greater than those used in the mobile station to ensure that the mobile station is sure to reestablish a connection that may be expiring in the PDSN. Various other techniques for pruning the connection table are known in the art and fall within the scope of the present invention.

In decision block 635, if there is active communication between the mobile station and the PCF, proceed to step 640 and reset the inactivity timer associated with the active PCF. It is possible for a mobile station to travel between PCFs contained in the connection table without any active communication. In fact, in some embodiments, such as described in FIG. 6, one benefit is that a fake origination, and its associated overhead, is not required. The respective inactivity timers should not be reset unless the PCF, and therefore the PDSN, are also aware that the mobile station has revisited a PCF coverage area. Any type of active communication may be used to reset an inactivity timer and indicate to the PCF and/or the PDSN that the mobile station has visited the PCF. In an alternate embodiment, a resource efficient message may be prescribed for use to reset an inactivity timer for a connection. Such a message may use less overhead than a registration procedure. For example, when a new PCF is visited in decision block 605, and the connection is determined to already exist in the connection table in decision block 610, such a message may be used to generate activity in decision block 635 to force the respective inactivity timers in both the mobile station and the PDSN to be reset.

In step 645, the various inactivity timers established for the connections in the connection table may be updated to account for time elapsed. Various techniques for maintaining inactivity timers are well known in the art. In decision block 650, if one or more inactivity timers have expired, proceed to step 655 and remove the connections corresponding to the expired timers. From either decision block 650 or step 655, proceed back to decision block 605 to begin the next iteration of the loop.

Figure 7:
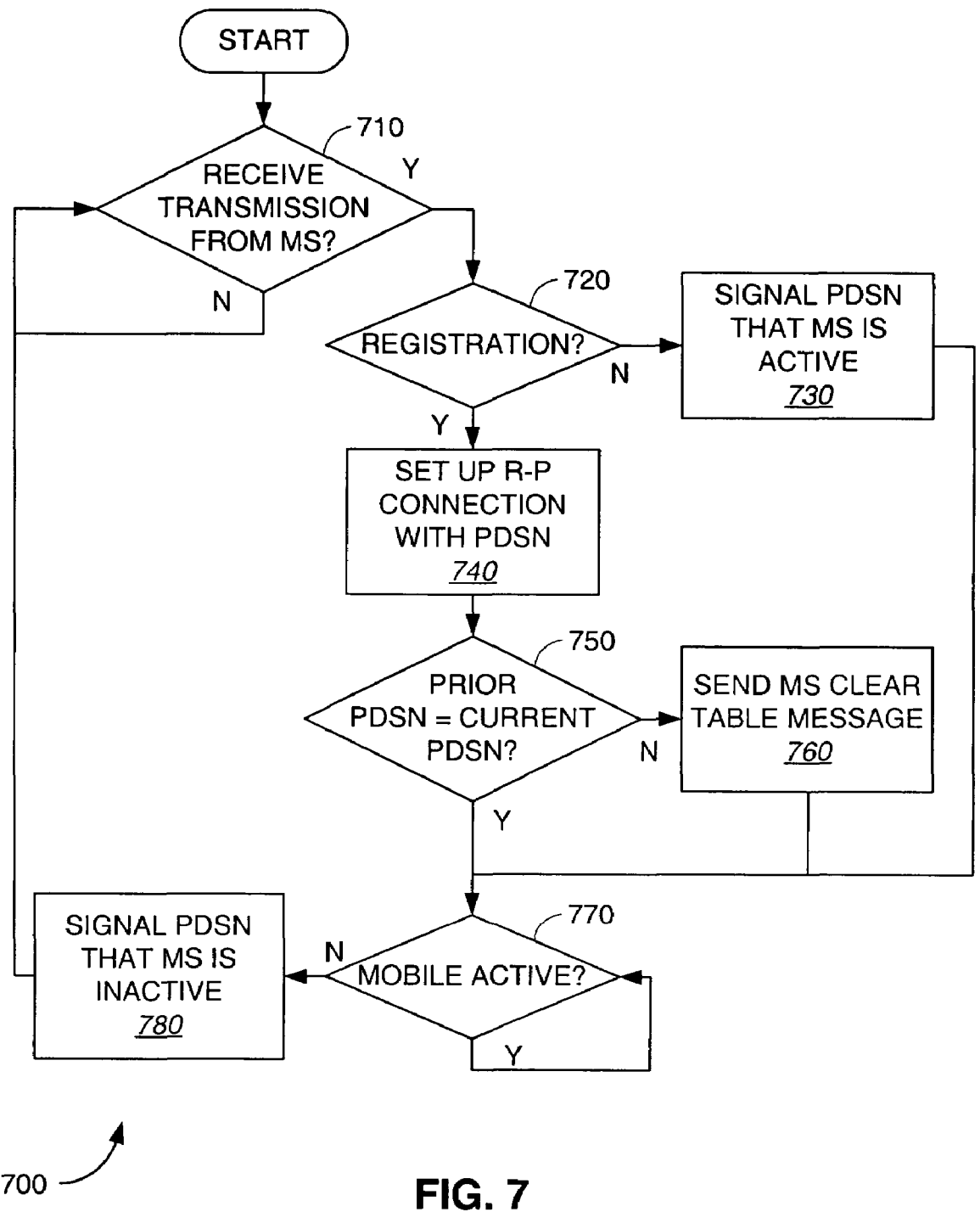
FIG. 7 is a flowchart of a method of processing registrations, maintaining multiple connections, and monitoring mobile station activity in a Packet Coordination Function (PCF)

FIG. 7 is a flowchart of a method 700 of processing registrations, maintaining multiple connections, and monitoring mobile station activity in a Packet Coordination Function (PCF). A PCF deployed to perform method 700 may operate with mobile stations configured to perform method 600, described above, as well as myriad other connection maintenance methods.

The process begins in decision block 710, which loops back to itself until the PCF receives a transmission from a mobile station and proceeds to decision block 720. In decision block 720, if the transmission is a registration, proceed to step 740 to set up a connection with the PDSN associated with the PCF. In this embodiment, an R-P connection is established. In an embodiment in which uncoordinated PDSNs are deployed, the registration procedure may provide a means to determine the identity of a previous PDSN the mobile station communicated with, and for which connections may have been maintained (examples of which are given above). In decision block 750, if the current PDSN, i.e. the PDSN to which the PCF connects, is the same as the prior PDSN, than any previously maintained connections may continue to be maintained. Proceed to decision block 770. If not, proceed to step 760 and send the mobile station a clear table message to indicate the mobile station's connection table should be cleared. Then proceed to decision block 770.

In decision block 720, if the received transmission is not a registration, proceed to step 730 and signal the PDSN that the mobile station is active. Any type of mobile station communication may be used to indicate activity. This step is optional, and may be used for pruning connection tables, as described above for mobile stations, and further detailed below for a PDSN. Proceed to decision block 770.

In decision block 770, the process remains as long as the mobile station is active. When the mobile station is no longer active, proceed to step 780, and signal the PDSN that the mobile station is inactive. Then return to decision block 710 to await the next mobile station transmission. Those of skill in the art will recognize that this process may be deployed to support a plurality of mobile stations communicating with the PCF, in varying states of activity or inactivity.

Figure 8:
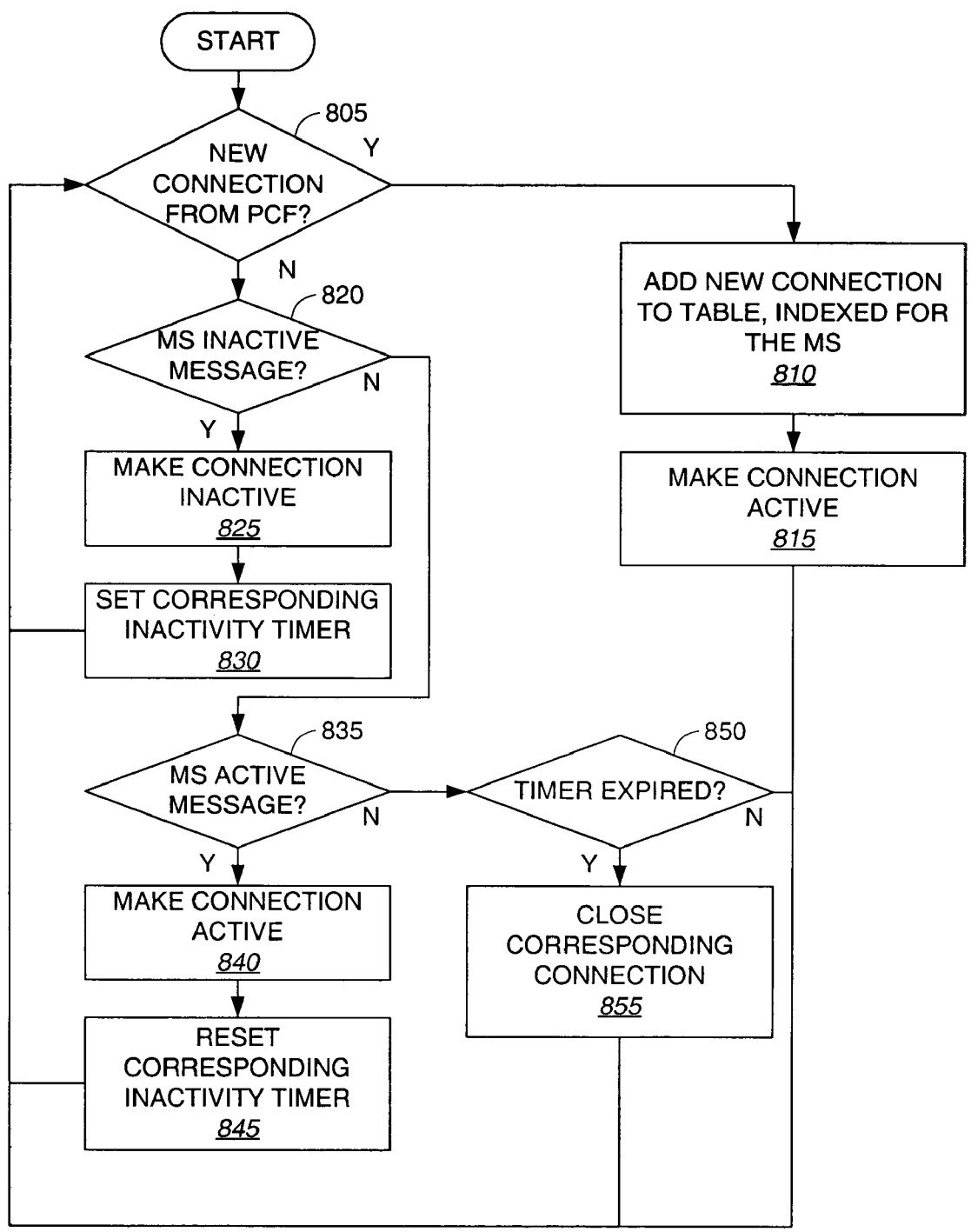
FIG. 8 is a flowchart of a method of maintaining multiple connections in a PDSN.

FIG. 8 is a flowchart of a method 800 of maintaining multiple connections in a PDSN. A PDSN deployed to perform method 800 may operate with mobile stations configured to perform method 600, described above, as well as myriad other connection maintenance methods. A PDSN deployed to perform method 800 may also operate with a PCF configured to perform method 700, described above, as well as myriad other methods.

The process begins in decision block 805. When a new connection is established with the PCF, proceed to step 810. The new connection is added to a connection table, associated with or indexed by the mobile station corresponding to the connection. In the example embodiment, an R-P connection is established. In step 815, the new connection is set to be the active connection. In this embodiment, at most one connection may be active at any one time. If an active connection goes dormant without another connection becoming active, a mobile station may have no active connection. The one or more connections for a mobile station are maintained in a connection table, as well as an indication of which connection, if any, is active. Designating one connection active may be useful in a variety of circumstances, an example technique for its use is detailed further below. The process then returns to decision block 805 for the next loop iteration. In decision block 805, if a new connection is not established, proceed to decision block 820.

In decision block 820, if the PDSN receives a mobile station inactive message, proceed to step 825. The PDSN makes the connection associated with the message inactive. In step 830, an inactivity timer and corresponding to the connection is set. Such a new activity timer may be used in similar fashion and in conjunction with an inactivity timer in a mobile station, as described with respect to the FIG. 6, above. An inactivity timer may be maintained for each connection, associated with one of a plurality of mobile stations, in the connection table. Various techniques for maintaining multiple timers are well known in the art. For example, discrete timers may be deployed in hardware. In an alternative, a start time may be stored for each inactivity timer. The start times may be subtracted from a common timer providing a current time, and the results compared with prescribed expiration times to determine if one or more timers have expired. Various other timing techniques will be readily adapted by those of skill in the art. The process then returns to decision block 805 for the next loop iteration. If a mobile station inactive message is not received in decision block 820, proceed to decision block 835.

In decision block 835, if a mobile station active message is received, proceed to step 840 to mark the connection associated with the message as the active connection for the respective mobile station. In step 845, the corresponding inactivity timer for that connection may be reset. If a mobile station active message was not received in decision block 835, proceed to decision block 850. In decision block 850, if a timer has expired, proceed to step 855 and close the corresponding connection. The connection may be removed from the connection table. As described above, a mobile station may concurrently maintain an inactivity timer corresponding to each maintained connection. The expiration times for the mobile station and the PDSN, respectively, may be selected to assure that the PDSN will not remove and close the corresponding connection prior to the mobile station. Thus, the mobile station will be insured the opportunity to reestablish a connection once it has been, or is close to being, closed at the PDSN. When the PDSN removes a connection it is assured that the mobile station is already aware that the connection will be removed. This feature is useful to avoid data loss. Note that, and one embodiment, when a single connection for a mobile station remains in the connection table, that connection will not be pruned based on inactivity. Thus, at least one connection is maintained for each mobile station until explicitly removed via some other mechanism. In an alternate embodiment, any or all connections may be removed based on inactivity. In yet another alternate embodiment, a longer expiration time may be required to remove the final connection. Those of skill in the art will readily adapt these and other techniques within the scope of the present invention. As before, pruning of connections in the connection table is optional.

Figure 9:
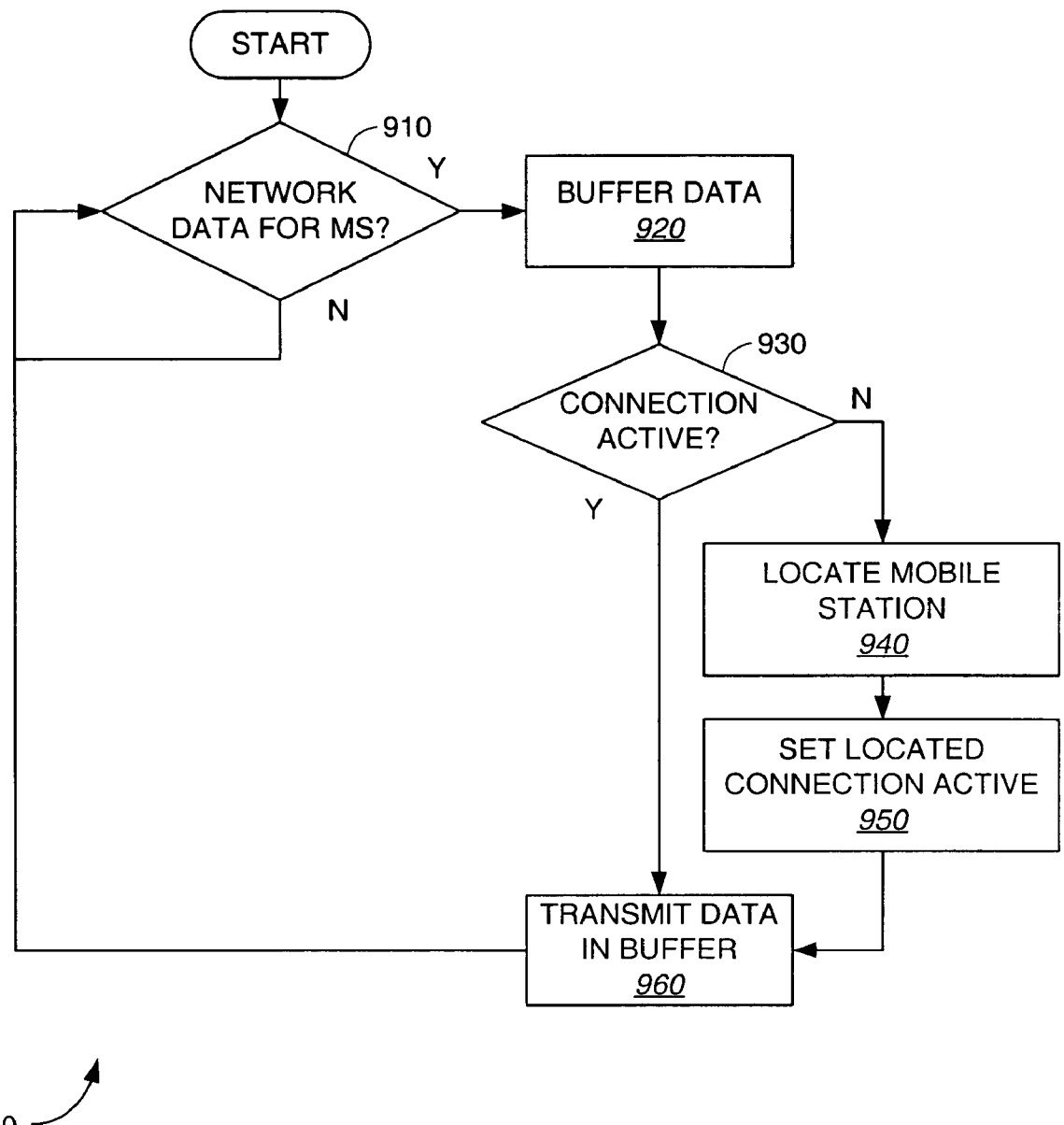
FIG. 9 is a flowchart of a method of initiating transmission of network data to a mobile station using multiple connections in a PDSN.

FIG. 9 is a flowchart of a method 900 of initiating transmission of network data to a mobile station using multiple connections in a PDSN. The process begins in decision block 910, where it remains until there is network data for transmitting to a mobile station from a PDSN. In step 920, the data for transmission is buffered to prevent data loss while a valid connection to the mobile station is found. In decision block 930, if an active connection is available, proceed to step 960 and began transmitting data from the buffer to the mobile station on the active connection. If only a single connection for the mobile station remains, that connection may be deemed the active connection, even if it has been made inactive, as described above. However, in a certain embodiment in which uncoordinated PDSNs are deployed, a mobile station, with no active connection, and whose last active connection would have been removed due to inactivity if not otherwise maintained, may have moved out of the range of the PDSN and may have registered with another PDSN, or otherwise discontinued communication with the PDSN. The mobile station is unlikely to respond to attempts to deliver data to it. This situation, where the PDSN receives data for transmission to a mobile station not within its coverage area, is perhaps reached due to a failure in a higher level protocol. Various exception routines for handling such an error are known in the art and may be deployed within the scope of the present invention. In one embodiment, which connection is active for a mobile station, if any, is maintained in the connection table.

In decision block 930, if no active connection is available, proceed to step 940 to locate the mobile station. When multiple connections are maintained for a mobile station, and none of them are active, the mobile station may have freely moved among PCFs connected to the PDSN without a required registration, and may currently be in a region serviced by any one of them. A variety of techniques for locating the mobile station may be deployed.

In one alternative, the PDSN directs a packet to the mobile station on multiple of the connections in the connection table. Each PCF corresponding to each of the multiple connections will then page the mobile station. The mobile station may respond on one of the connections if the page is received. To locate the mobile station fastest, all the open but inactive connections may be used to locate the mobile station, at the expense of increased paging channel utilization. Any subset of the maintained connections may be used as well.

In another alternative, a mobile station may be located by serially accessing each of the multiple connections maintained. A certain amount of time will be allotted between a page on one connection and the response from the mobile station, if any. If the allotted time transpires without a response, the next connection will be tested. In one embodiment, the most recent active connection is utilized first, followed by the next most recent active connection, and so forth, until attempts have been made on all the connections. In another embodiment, the connection to attempts for his may be selected randomly. A combination of these techniques may also be deployed.

In step 950, the connection on which the mobile station is located is set as the active connection, and the data in the buffer is transmitted to the mobile station on that connection accordingly, in step 960. The process then returns to decision block 910.

By buffering the data in the PDSN while the mobile station is located, data loss may be avoided, as well as the associated overhead used for retransmission or other error control protocol. Meanwhile, a mobile station is free to travel throughout the areas serviced by the PDSN without repeated registrations, thus reducing associated overhead, and conserving system capacity.

It should be noted that, in all the embodiments described above, method steps can be interchanged without departing from the scope of the invention. The descriptions disclosed herein have in many cases referred to signals, parameters, and procedures associated with the cdma2000 standard, but the scope of the present invention is not limited as such. Those of skill in the art will readily apply the principles herein to various other communication systems. These and other modifications will be apparent to those of ordinary skill in the art.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless communication device, comprising:
    a connection table for storing one or more connection identifiers, wherein a connection identifier corresponds to a Packet Coordination Function (PCF) that has been previously visited by the wireless communication device, the connection table indicating whether a connection between the wireless communication device and each PCF is active;
    a receiver for receiving a connection identifier;
    a processor for determining if the received connection identifier is contained in the connection table, and for delivering the received connection identifier to the connection table for storing when the received connection identifier is not contained in the connection table;
    a transmitter for sending a registration in response to the received connection identifier when the received connection identifier is not contained in the connection table; and
    a first inactivity timer associated with the connection identifier, wherein the processor removes the connection identifier from the connection table in response to an expiration of the first inactivity timer, the first inactivity timer configured to expire before a second inactivity timer maintained in a Packet Data Serving Node (PDSN) to which the wireless communication device is connected via the PCF and which is also associated with the connection identifier;
    wherein the processor resets the first inactivity timer in response to activity on a connection corresponding to the connection identifier, and
    wherein the processor is further operable to determine that the registration is not needed if the processor determines that received connection identifier is contained in the connection table.

2. The wireless communication device of claim 1, wherein the processor clears the connection table when a connection is received corresponding to a Packet Data Serving Node (PDSN) that is different from a PDSN corresponding to a previously stored connection.

3. The wireless communication device of claim 1, wherein the processor clears the connection table when a clear table message is received by the receiver.

4. A Packet Data Serving Node (PDSN), operable with a plurality of Packet Coordination Functions (PCFs) via a corresponding plurality of connections, each PCF operable to communicate with one or more wireless communication devices, the PDSN further operable with a network for directing data for transmission to one or more wireless communication devices, comprising:
    a connection table for storing a plurality of connection sets, each connection set comprising one or more connections associated with a wireless communication device, wherein a first timer in the PDSN and a second timer in the wireless communication device correspond to each of the connections and wherein the first timer is set to expire after the second timer;
    a processor for selecting a connection from the one or more connections in a connection set associated with a wireless communication device for which data is directed from the network; and
    a buffer for receiving data from the network that is designated for delivery to a wireless communication device, storing the received data until the wireless communication device is located, based on an active connection, on one of the connections in the connection set and transmitting the stored data on the selected connection to the wireless communication device.

5. The Packet Data Serving Node (PDSN) of claim 4, wherein an active connection identifier is stored in the connection table to identify zero or one active connection for each wireless communication device.

6. The Packet Data Serving Node (PDSN) of claim 5, wherein the processor selects all of the connections associated with a wireless communication device for transmission to the wireless communication device when no connection for the wireless communication device is identified as active.

7. The Packet Data Serving Node (PDSN) of claim 5, wherein the processor selects a subset of the connections associated with a wireless communication device for transmission to the wireless communication device when no connection for the wireless communication device is identified as active.

8. The Packet Data Serving Node (PDSN) of claim 5, wherein the processor selects the most recent active connection from the connections associated with a wireless communication device for transmission to the wireless communication device when no connection for the wireless communication device is identified as active.

9. The Packet Data Serving Node (PDSN) of claim 5, wherein the processor selects one or more connections randomly from the connections associated with a wireless communication device for transmission to the wireless communication device when no connection for the wireless communication device is identified as active.

10. The Packet Data Serving Node (PDSN) of claim 4, further comprising a plurality of timers corresponding to the plurality of stored connections, wherein the processor removes a connection from the connection table upon expiration of one of the plurality of timers associated with the connection.

11. The Packet Data Serving Node (PDSN) of claim 10, wherein the processor resets one of the plurality of timers in response to an activity indicator associated with the mobile station on the corresponding connection.

12. A method of registering and maintaining connections, comprising:
receiving a connection identifier at a wireless communication device;
determining if the received connection identifier is contained in a connection table, and registering a connection in response to a received connection not contained in the connection table;
storing the received connection identifier in the connection table when the connection is not contained in the connection table, wherein the connection identifier corresponds to a Packet Coordination Function (PCF) that has been previously visited by the wireless communication device and indicates whether a connection between the PCF and the wireless communication device is active;
determining that the registration is not needed if the received connection identifier is in the connection table; and
removing the connection identifier from the connection table in response to expiration of a first inactivity timer associated with the connection identifier and maintained by the wireless communication device, the first inactivity timer configured to expire before a second inactivity timer maintained in a Packet Data Serving Node (PDSN) to which the wireless communication device is connected via the POF and which is also associated with the connection identifier;
wherein the first inactivity timer is reset in response to activity on the connection corresponding to the connection identifier.

13. The method of claim 12, further comprising:
receiving a clear table message; and
clearing the connection table in response to the clear table message.

14. A method of registering and maintaining connections, comprising:
establishing one or more connections with one or more Packet Coordination Functions (PCFs);
storing a plurality of connection sets in a connection table, each connection set comprising one or more connections with a POF and associated with a wireless communication device;
buffering received data from a network that is designated to a wireless communication device, storing the received data until the wireless communication device is located, based on an active connection, on one of the connections in the connection set;
selecting a connection from the one or more connections in a connection set associated with a wireless communication device for which data is directed and transmitting the stored data on the selected connection to the wireless communication device; and
maintaining a plurality of first timers that correspond to each of the connections and wherein each of the plurality of first timers are set to expire after each of a plurality of second timers in the wireless communication device.

15. The method of claim 14, further comprising maintaining a plurality of timers corresponding to the plurality of stored connections and removing a connection from the connection table upon expiration of one of the plurality of timers associated with the connection.

16. An apparatus, comprising:
means for receiving a connection identifier at a wireless communication device;
means for storing the received connection identifier in a connection table when the connection is not contained in the connection table, wherein a connection identifier corresponds to a Packet Coordination Function (PCF) that has been previously visited by the apparatus and indicates whether a connection between the PCF and the wireless communication device is active;
means for determining if the received connection identifier is contained in a connection table, and
means for registering a connection in response to a received connection not contained in the connection table;
means for determining that the registration is not needed if the received connection identifier is in the connection table; and
means for removing the connection identifier from the connection table in response to expiration of a first inactivity timer associated with the connection identifier and maintained by the wireless communication device, the first inactivity timer configured to expire before a second inactivity timer maintained in a Packet Data Serving Node (PDSN) to which the wireless communication device is connected via the PCF and which is also associated with the connection identifier;
wherein the first inactivity timer is reset in response to activity on the connection corresponding to the connection identifier.

17. An apparatus, comprising:
means for establishing one or more connections with one or more Packet Coordination Functions (PCFs);
means for storing a plurality of connection sets in a connection table, each connection set comprising one or more connections with a PCFs and associated with a wireless communication device, wherein a first timer in the apparatus and a second timer in the wireless communication device correspond to each of the connections and wherein the first timer is set to expire after the second timer;
means for buffering received data from a network that is designated to a wireless communication device;
means for storing the received data until the wireless communication device is located, based on an active connection, on one of the connections in the connection set;
means for selecting a connection from the one or more connections in a connection set associated with a wireless communication device for which data is directed; and
means for transmitting the stored data on the selected connection to the wireless communication device.

* * * * *

UNITED STATES PATENT AND TRADEMARK OFFICE
CERTIFICATE OF CORRECTION

| | | |
|---|---|---|
| PATENT NO. | : 7,688,786 B2 | |
| APPLICATION NO. | : 10/665929 | |
| DATED | : March 30, 2010 | |
| INVENTOR(S) | : Abrol et al. | |

It is certified that error appears in the above-identified patent and that said Letters Patent is hereby corrected as shown below:

Column 15, line 40, claim 12: "POF" to read as --PCF--

Column 15, line 55, claim 14: "POF" to read as --PCF--

Column 16, line 47, claim 17: "a PCFs" to read --the PCFs--

Signed and Sealed this
Fourteenth Day of June, 2011

David J. Kappos
*Director of the United States Patent and Trademark Office*